United States Patent
Churchley (10) Patent No.: US 9,611,887 B2
(45) Date of Patent: Apr. 4, 2017

(54) FLEXIBLE INSULATING LINER FOR BEARINGS

(71) Applicant: Kaydon Corporation, Ann Arbor, MI (US)

(72) Inventor: Stephen Churchley, Twin Lake, MI (US)

(73) Assignee: Kaydon Corporation, Ann Arbor, MI (US)

( * ) Notice: Subject to any disclaimer, the term of this patent is extended or adjusted under 35 U.S.C. 154(b) by 0 days.

(21) Appl. No.: 14/722,971

(22) Filed: May 27, 2015

(65) Prior Publication Data

US 2016/0348717 A1 Dec. 1, 2016

(51) Int. Cl.
  *F16C 41/04* (2006.01)
  *F16C 19/52* (2006.01)
  *F16C 35/077* (2006.01)

(52) U.S. Cl.
  CPC ............ *F16C 19/52* (2013.01); *F16C 35/077* (2013.01)

(58) Field of Classification Search
  CPC ...... F16C 19/52; F16C 19/527; F16C 33/586;
         F16C 35/07; F16C 35/073; F16C 35/077;
                    F16C 41/00; F16C 41/002
  USPC ................................. 384/535, 536, 581, 582
  See application file for complete search history.

(56) References Cited

U.S. PATENT DOCUMENTS

| | | | |
|---|---|---|---|
| 1,152,680 A | 9/1915 | Wieselgreen | |
| 1,456,804 A | 5/1923 | Kingsbury | |
| 3,924,906 A | 12/1975 | Kitaoka | |
| 4,109,978 A | 8/1978 | Ernst et al. | |
| 4,772,139 A * | 9/1988 | Bretton | F16C 27/04 384/535 |
| 4,997,293 A * | 3/1991 | Ono | F16C 19/00 384/476 |
| 5,375,933 A * | 12/1994 | Mizutani | F16C 19/52 384/476 |
| 5,735,615 A * | 4/1998 | Pontzer | F16C 35/00 384/476 |
| 5,961,222 A * | 10/1999 | Yabe | F16C 19/52 384/476 |
| 6,030,128 A | 2/2000 | Pontzer | |

(Continued)

FOREIGN PATENT DOCUMENTS

| | | | |
|---|---|---|---|
| DE | 4224695 | * | 7/1992 |
| DE | 102009056352 | * | 6/2011 |

OTHER PUBLICATIONS

SKF, "Electrically insulated bearings from SKF," publication, May 2006, 12 pages.

(Continued)

*Primary Examiner* — James Pilkington
(74) *Attorney, Agent, or Firm* — Price Heneveld LLP (57) ABSTRACT

A flexible insulating liner strip or member comprises an elongated flexible structure that can be cut to length and positioned between a race of a bearing and a bearing housing to electrically insulate the bearing race from the bearing housing and/or other components. The flexible insulating liner strip may be segmented to provide flexibility, and one or more portions of the flexible insulating liner strip may be curved to accommodate variations in the dimensions of bearing housings and races. The flexible insulating liner strip provides a cost-effective way to electrically insulate bearings.

35 Claims, 8 Drawing Sheets

(56) References Cited

U.S. PATENT DOCUMENTS 8,038,352 B2 * 10/2011 Dodoro ................ F16C 27/066
                                                           384/535

OTHER PUBLICATIONS

NKE, "NKE electrically insulated rolling bearings," publication, Mar. 10, 2011, 4 pages.
Schaeffler Techologies GmbH & Co. KT, Current-Insulating Bearings, publication, Apr. 2011, 22 pages.
Franke, "an invention prevails", publication, Nov. 10, 2011, 22 pages.

* cited by examiner

FLEXIBLE INSULATING LINER FOR BEARINGS

BACKGROUND OF THE INVENTION

Known bearings typically include inner and outer races that are made from hardened steel, and a plurality of rolling elements such as steel balls that are disposed between the races. Because the races and rolling elements are made from metal, electricity can be conducted between the inner and outer races through the rolling elements. In some applications, an electrically non-conductive bearing is required. Known electrically non-conductive bearings may utilize ceramic balls or other rolling elements that are electrically non-conductive. However, ceramic balls are relatively expensive, and may suffer from other drawbacks.

SUMMARY OF THE INVENTION

One aspect of the present invention is an electrically isolated bearing assembly including a housing assembly having a ring-shaped outer housing and a ring-shaped inner housing that is disposed inside the outer housing. The inner and outer housings define an annular space therebetween. A bearing is disposed in the annular space. The bearing includes metal inner and outer races and a plurality of metal roller elements disposed between the metal inner and outer races. The bearing assembly further includes at least one elongated flexible insulating strip disposed between the bearing and the housing. The insulating member or strip comprises polymer or other suitable electrically non-conductive material to thereby prevent formation of an electrical path through the roller elements. The insulating member or strip has an elongated base or central portion and first and second segmented leg structures extending from the base portion whereby the elongated flexible member or strip is generally U-shaped and forms a channel that is configured to at least partially receive a bearing race. The first and second segmented leg structures each include a plurality of legs that are disconnected from one another to permit flexing of the elongated flexible insulating member or strip about the elongated base portion. At least a portion of a selected one of the inner and outer races is disposed between the first and second segmented leg structures.

Another aspect of the present invention is an elongated flexible insulating strip for electrically insulating a bearing race. The insulating strip includes a base or central portion including a plurality of base segments that are interconnected by flexible connecting portions having increased flexibility relative to the base segments. A segmented leg structure includes a plurality of spaced apart leg portions extending transversely from the base portion whereby flexing of the connecting portions causes a dimension between adjacent leg portions to change. The elongated flexible insulating strip comprises an electrically non-conductive polymer material whereby the elongated flexible insulating strip is configured to be cut to length and flexed into an annular shape corresponding to an annular bearing race.

Another aspect of the present invention is a method of electrically isolating a bearing of the type that includes electrically conductive inner and outer races and a plurality of electrically conductive roller elements disposed between the inner and outer races. The method includes providing an elongated flexible insulating strip comprising a material that is electrically non-conductive. The insulating strip has an elongated base or central portion, elongated first and second opposite edge portions, and at least one integrally formed leg portion that extends from the first opposite edge portion transverse to the central portion. The method includes cutting the insulating strip to length, followed by flexing the insulating strip to form a ring. The insulating strip is positioned in an annular space between a bearing race and a housing to electrically isolate the bearing race from the housing.

These and other features, advantages, and objects of the present invention will be further understood and appreciated by those skilled in the art by reference to the following specification, claims, and appended drawings.

DETAILED DESCRIPTION

Figure 1:
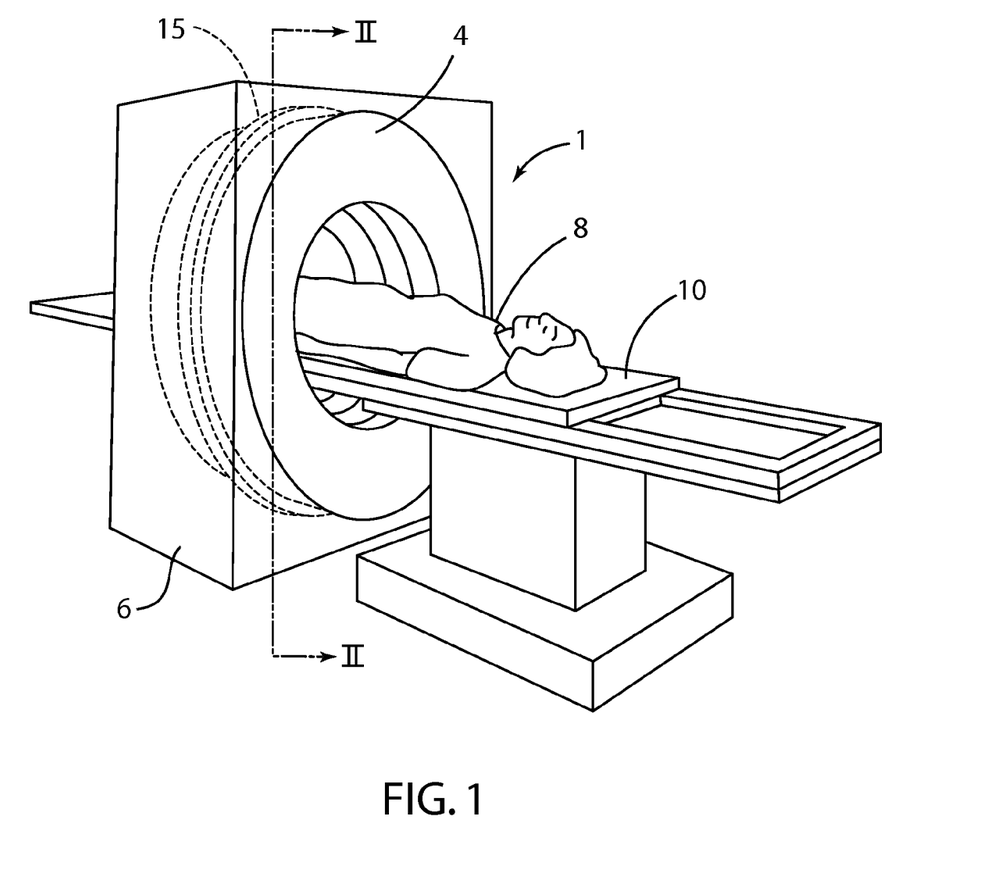
FIG. 1 is a partially schematic isometric view of a CT scanning machine including a bearing assembly and Flexible Insulating Liner Strip ("FIL Strip") according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
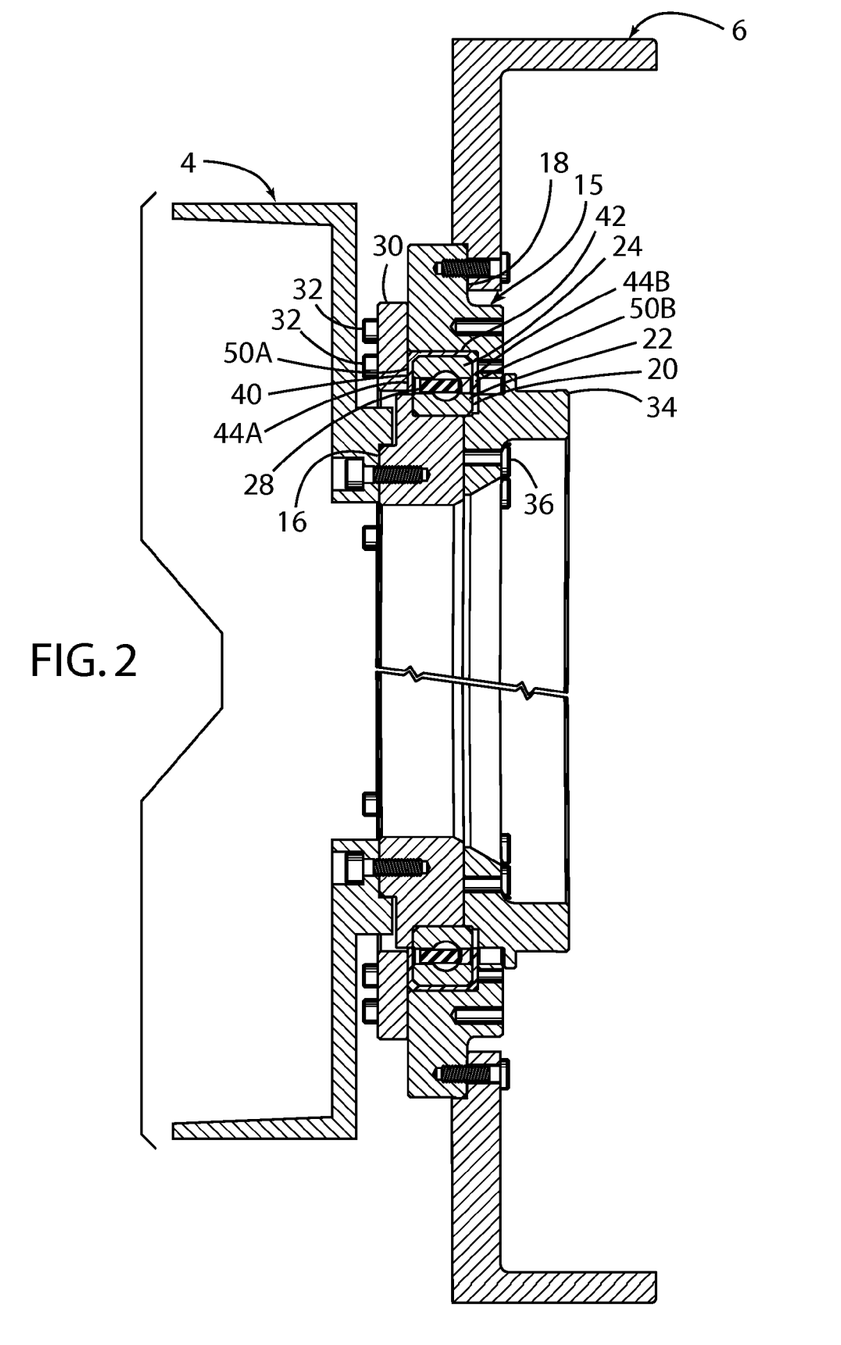
FIG. 2 is a partially fragmentary schematic view of the CT scanning machine of FIG. 1 taken along the line II-II.

With reference to FIGS. 1 and 2, a CT or CAT scanning machine 1 includes a rotating ring-shaped assembly or drum 4 that is rotatably supported by a base 6. Various electrical components such as an X-ray tube, detectors, etc. (not shown) are supported by the drum 4. In use, the rotating drum 4 rotates about a patient 8 who is positioned on a movable support 10. Drum 4, base 6, and movable support 10 may comprise known components, and it will be understood that these items are shown in partially schematic form in FIGS. 1 and 2 for clarity. The drum 4 is rotatably supported on the base 6 by one or more bearing assemblies 15. As discussed in more detail below, the bearing assembly 15 includes a flexible insulating liner strip or member ("FIL Strip") 40 (FIG. 4) that electrically isolates the rotating assembly 4 from the base 6 to thereby prevent flow of electricity between the rotating assembly 4 and base 6 (see also FIG. 2). It will be understood that FIL Strip 40 may be utilized in a wide variety of applications, and the present invention is not limited to CT scanning machine applications.

Figure 3:
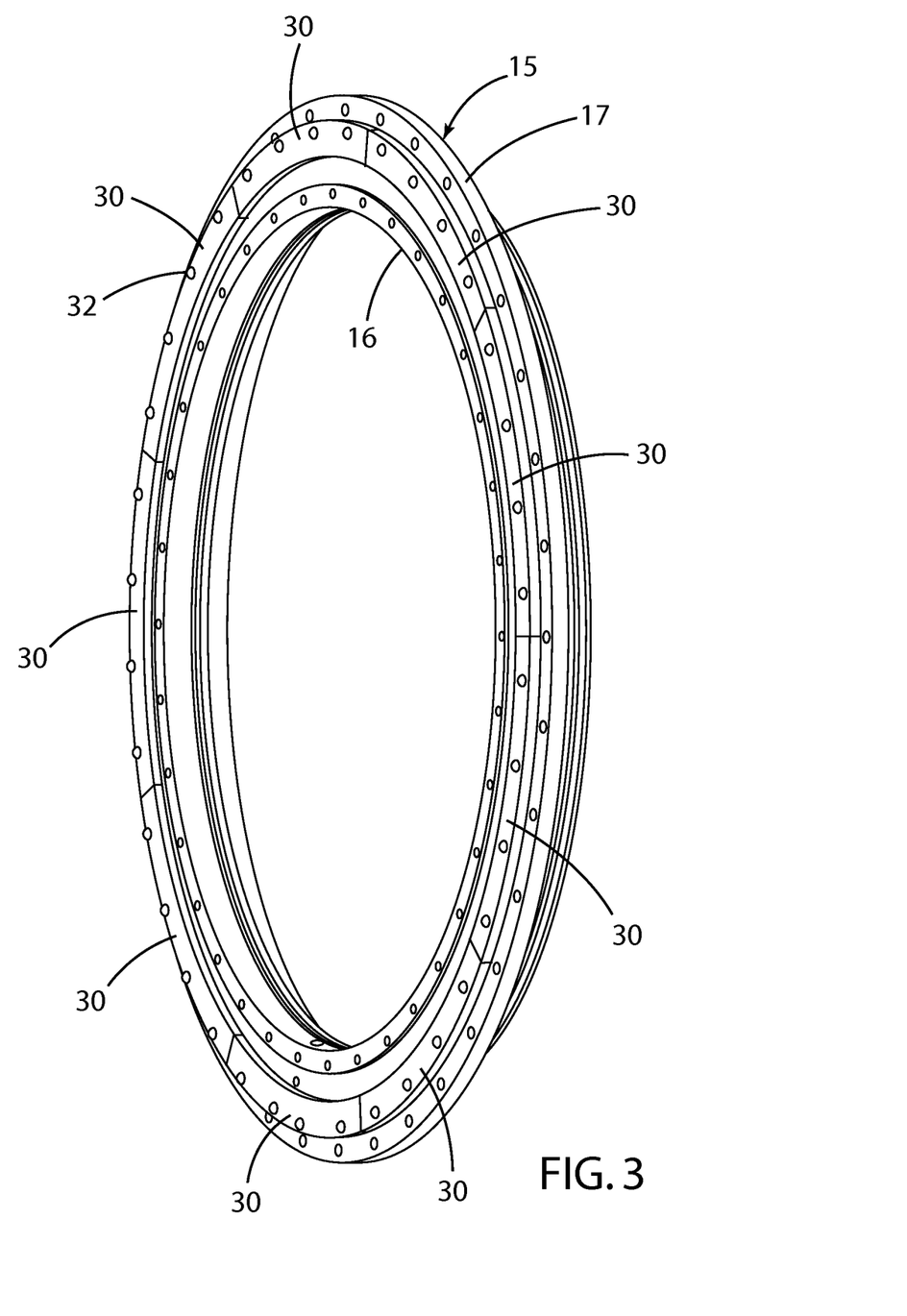
FIG. 3 is an isometric view of a bearing assembly according to one aspect of the present invention.
Figure 4:
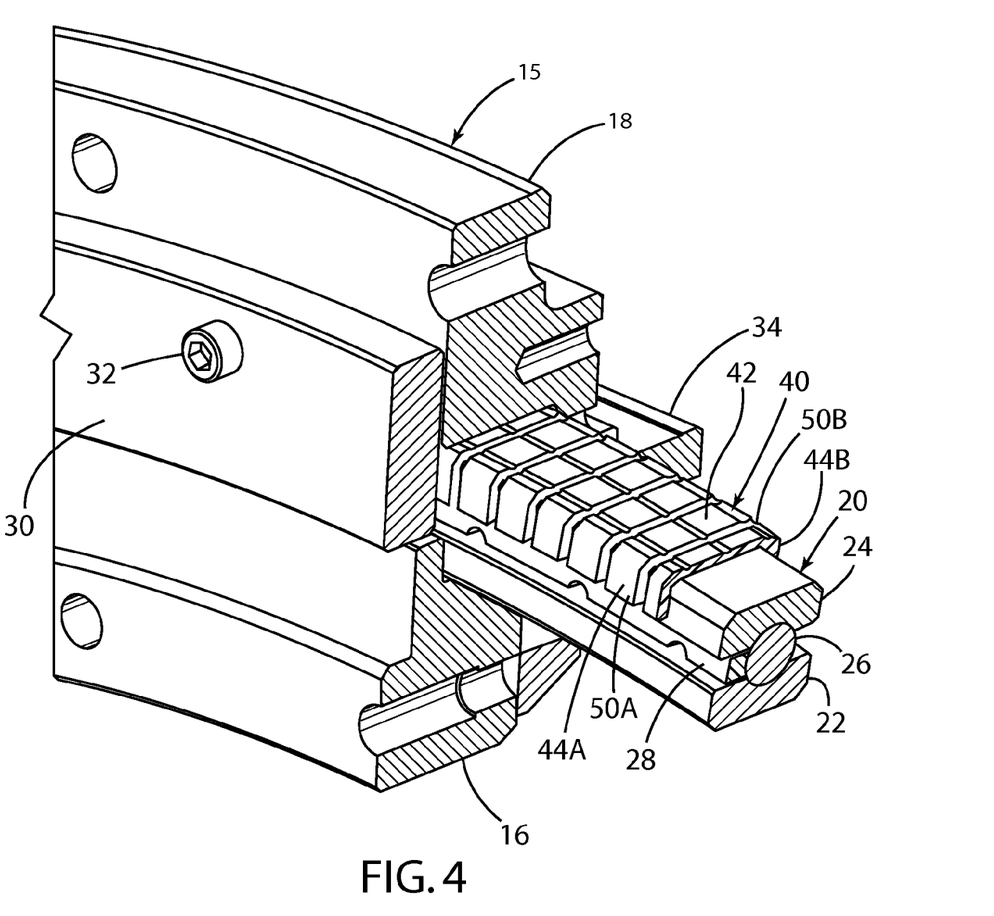
FIG. 4 is a fragmentary isometric view of a portion of the bearing assembly of FIG. 3.
Figure 5:
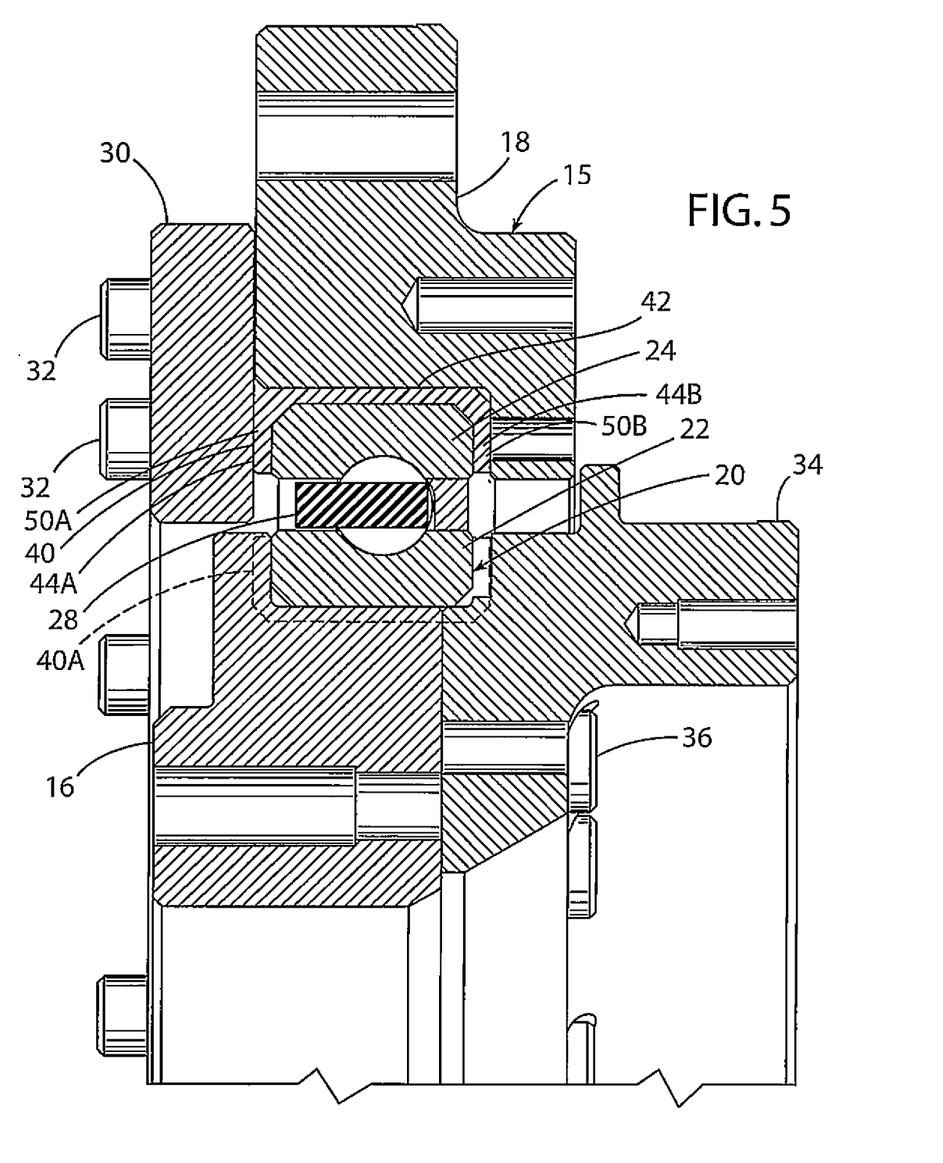
FIG. 5 is a cross sectional view of the bearing assembly of FIG. 4.

With reference to FIGS. 3-5, bearing assembly 15 includes an inner housing 16 and an outer housing 18. The inner and outer housings 16 and 18 support a bearing subassembly 20. The bearing subassembly 20 includes an inner race 22 and an outer race 24. A plurality of roller elements such as balls 26 are positioned between the inner and outer races 22 and 24, and a cage or separator 28 positions the balls 26 between the inner and outer races 22 and 24 in a known manner. The inner and outer races 22 and 24, respectively, and the balls 26 are preferably metal (e.g. hardened steel). The separator or cage 28 may comprise polymer. Bearing subassembly 20 may comprise a known thin section bearing that is commercially available from Kaydon Corporation, Bearings Division, Muskegon, Mich.

A first clamp comprises a plurality of clamp segments 30 that are secured to outer housing 18 by threaded fasteners 32. A second clamp 34 is secured to inner housing 16 by a plurality of threaded fasteners 36. The elongated flexible insulating liner strip or member ("FIL Strip") 40 is positioned around outer race 24, and thereby prevents electrical conduction from the inner and outer housings 16 and 18, respectively, through the bearing subassembly 20. As discussed in more detail below, the FIL Strip 40 comprises molded polymer, and includes an elongated central portion 42 and transversely-extending segmented leg portions 44A and 44B. In the illustrated example, the FIL Strip 40 is positioned adjacent the outer race 24 to electrically isolate the outer race 24 from the outer housing 18. However, the FIL Strip 40 may, alternatively, be positioned between the inner race 22 and inner housing 16 and second clamp 34 as shown by dashed line 40A to electrically isolate the inner race 22 from these components. Significantly, FIL Strip 40 can be utilized to electrically isolate a conventional bearing subassembly 20 comprising electrically conductive metal races 22 and 24, and electrically conductive roller elements such as steel balls 26.

Figure 6:
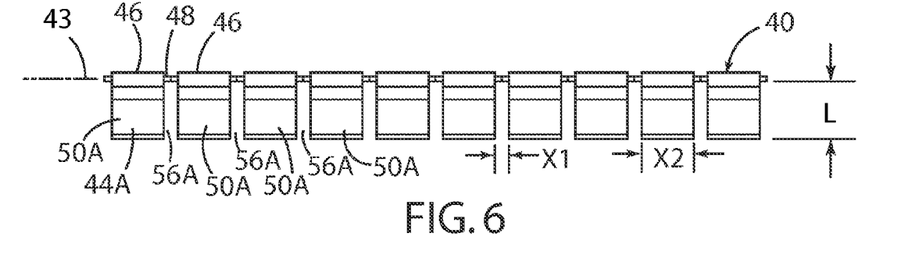
FIG. 6 is a side elevational view of a FIL Strip according to one aspect of the present invention.
Figure 7:
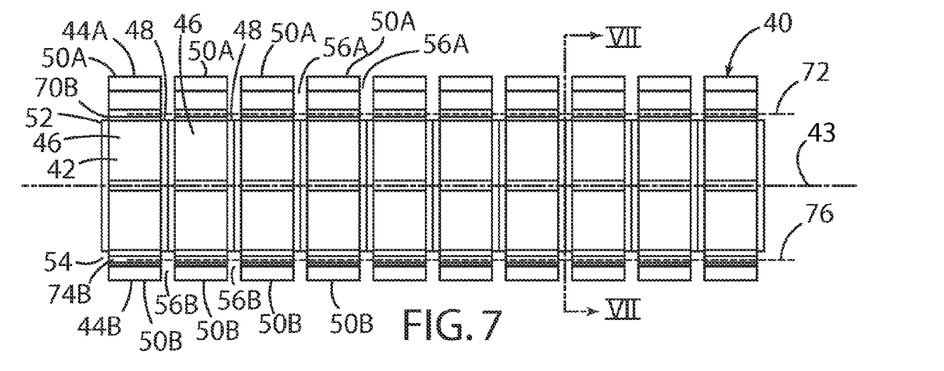
FIG. 7 is a top plan view of the FIL Strip of FIG. 6.
Figure 8:
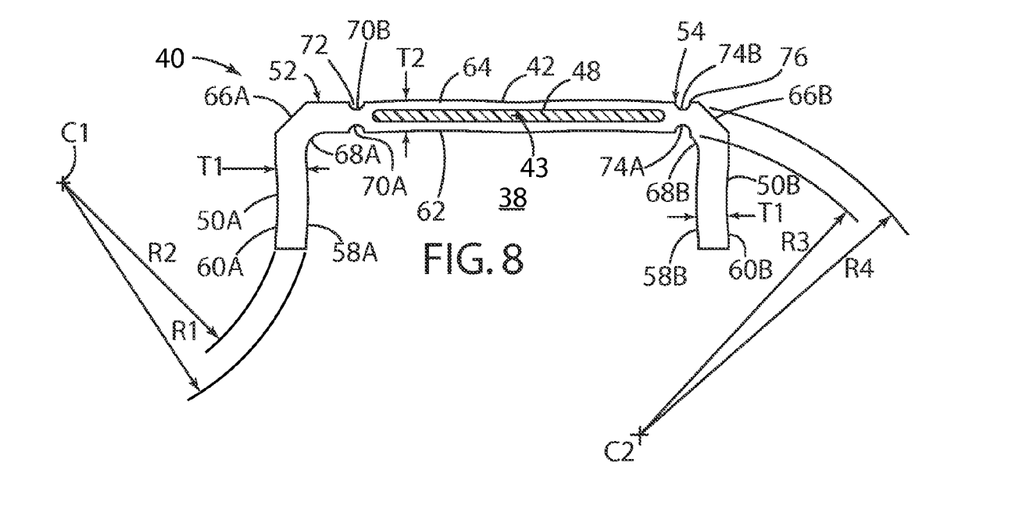
FIG. 8 is a cross sectional view of the FIL Strip of FIG. 7 taken along the line VIII-VIII.

With further reference to FIGS. 6-8, the FIL Strip 40 is initially molded to form an elongated flexible structure having an elongated base or central portion 42 defining an axis 43 extending along the length of the FIL strip 40. The elongated central portion 42 includes a plurality of generally rectangular plate-like base segments 46 that are interconnected by thinner connecting portions 48. The connecting portions 48 have reduced thickness relative to the segments 46, and the connecting portions 48 therefore have increased flexibility relative to the segments 46. The elongated central portion 42 of FIL Strip 40 includes first and second opposite edge portions 52 and 54. A plurality of first legs 50A extend transversely from the first edge portion 52, and a plurality of second legs 50B extend from the second edge portion 54 of elongated central portion 42 of FIL Strip 40. Legs 50A are spaced apart to form gaps 56A, and legs 50B are spaced apart to form gaps 56B. The gaps 56A and 56B permit bending/flexing of the elongated central portion 42 whereby the FIL Strip 40 can be flexed into an annular ring shape corresponding to the shape of the inner race 22 or outer race 24 of bearing subassembly 20. The individual legs 50A and 50B may comprise flanges or flat plate like members with a generally rectangular perimeter when viewed from the side (e.g. FIG. 6). However, the legs 50A and/or 50B may comprise virtually any suitable shape. The individual legs 50A and 50B provide side-to-side support for the bearing race 24 (or 22), and thereby ensure that the race 24 is electrically isolated relative to the first clamp 30 and outer housing 18. The gaps 56A and 56B may have a dimension "X1" of about 0.20 cm (0.080 inches), and the legs 50A and 50B may have a width dimension "X2" of about 0.76 cm (0.300 inches). The legs 50A and 50B may have a length "L" of about 0.76 cm (0.300 inches), and a thickness "T1" (FIG. 8) of about 0.198 cm (0.078 inches). However, it will be understood that the shapes and sizes of the various features of the FIL Strip 40 may be varied as required for a particular application.

With reference to FIG. 8, legs 50A have inner surfaces 58A, and outer surfaces 60A. Legs 50B have inner surfaces 58B and outer surfaces 60B. Legs 50B are a mirror image of legs 50A. Legs 50A and 50B are curved, such that inner surface 58A is convex with a radius R1 about an axis "C1." Axis C1 is parallel to axis 43 of FIL Strip 40. Outer surface 60A is concave, with a radius R2 about axis C1. The legs 50A and 50B have a substantially uniform thickness "T1" of about 0.198 cm (0.078 inches). Radius "R1" is preferably about 2.548 cm (1.003 inches), and the radius "R2" is preferably about 0.235 cm (0.924 inches).

The curvature/bend of the legs 50A and 50B accommodates variations due to tolerances in the various components. As shown in FIG. 5, the legs 50A are positioned between outer race 24 and first clamp 30. As the threaded fasteners 32 are tightened, the clamp 30 pushes against the outer surface 60A of legs 50A, and the inner surface 58A of legs 50A contacts the outer race 24. The space between outer race 24 and first clamp 30 is preferably slightly greater than the thickness T1 of legs 50A, such that the legs 50A flex and straighten somewhat due to the curvature of surfaces 58A and 60A as first clamp 30 is clamped in place. Similarly, the second legs 50A are positioned between outer housing 18 and outer race 24, and flex as first clamp 30 is clamped due to tightening of threaded fasteners 32. In this way, the curvature of the legs 50A and 50B ensures that the outer race 24 is firmly retained upon clamping of clamp 30 even if the dimensional tolerances of the components varies somewhat.

Referring again to FIG. 8, the segments 46 of elongated central portion 42 of FIL Strip 40 include an inner surface 62 and an outer surface 64. The surfaces 62 and 64 are preferably spaced apart a substantially uniform distance "T2" of about 0.079 inches (0.201 cm). Inner surface 62 has a concave shape defining a radius "R3" about an axis "C2," and outer surface 64 has a convex shape defining a radius R4 about axis C2. Axis C2 is parallel to axis 43 of FIL Strip 40. The radius R3 is preferably about 2.831 inches (2.191 cm), and the radius R4 is preferably about 2.910 inches (7.391 cm).

Referring again to FIG. 5, when assembled the elongated central portion 42 of FIL Strip 40 is positioned between outer housing 18 and outer race 24, with inner surface 62 contacting outer race 24, and outer surface 64 contacting outer housing 18. The curved surfaces 62 and 64 ensure that the outer race 24 is securely positioned relative to outer housing 18 even if dimensional tolerances in the components result in the annular space between outer race 24 and outer housing 18 being greater than the thickness T2 of FIL Strip 40.

Referring again to FIG. 8, the FIL Strip 40 preferably includes outer chamfers 66A and 66B, and inner radiuses 68A and 68B in the transition region between the elongated central portion 42 and the legs 50A and 50B. A first pair of grooves 70A and 70B are formed in surfaces 62 and 64, respectively, to define a first cut line 72 (see also FIG. 7) extending lengthwise along the FIL Strip 40. A second pair of grooves 74A and 74B in surfaces 62 and 64, respectively, define a second cut line 76 extending along the length of FIL Strip 40. As shown in FIG. 8, the FIL Strip 40 is generally U-shaped in cross section, and defines a channel 38 that is configured to receive bearing races 22 and/or 24. However, as discussed below, the FIL Strip 40 can be cut along first cut line 72 or second cut line 76 to provide an L-shaped FIL Strip having a single row of legs 50A or a single row of legs 50B.

Figure 9:
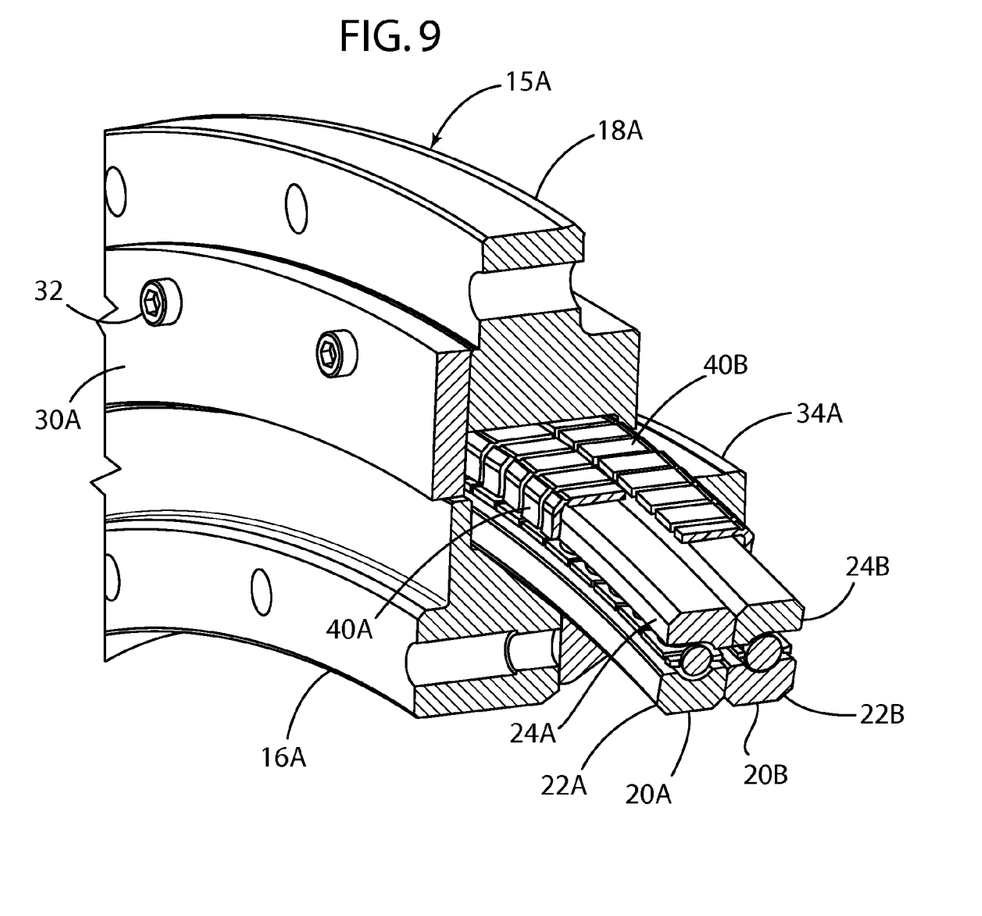
FIG. 9 is a partially fragmentary perspective view of a bearing assembly according to another aspect of the present invention including a pair of side-by-side ball bearings.

With further reference to FIG. 9, a bearing assembly 15A includes an inner housing 16A and outer housing 18A that are configured to support a pair of bearing assemblies 20A and 20B in a side-by-side configuration. A pair of elongated FIL Strips 40 are modified by cutting the FIL Strips 40 along a selected one of the first and second cut lines 72 and 76 to form a pair of L-shaped FIL Strips 40A and 40B. The elongated FIL Strips 40A and 40B engage the outer races 24A and 24B, respectively, of bearing assemblies 20A and 20B, respectively. Clamps 30A and 34A engage the outer housing 18A and inner housing 16A, respectively to clamp and position the bearing assemblies 20A and 20B. Referring again to FIG. 8, the first cut line 72 may be positioned further from legs 50A a distance that is greater than a distance from the second cut line 76 to the second legs 50B. This permits the size of the FIL Strip 40 to be varied/selected as required by cutting it along a selected one of the cut lines 72 and 74 to accommodate bearing assemblies having different sizes.

Figure 10:
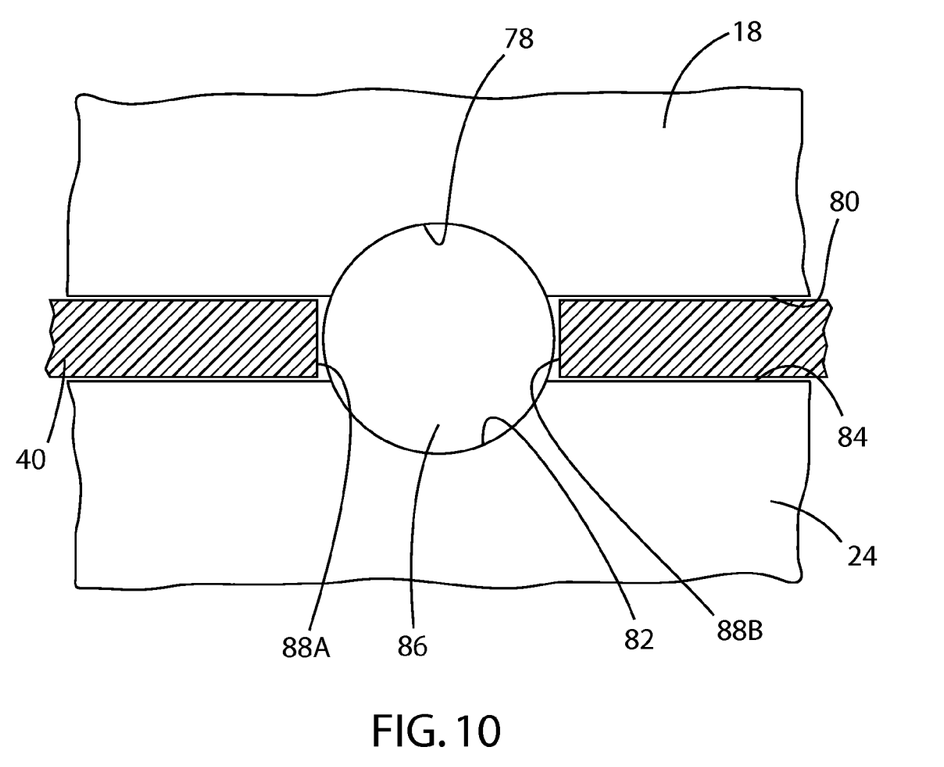
FIG. 10 is a fragmentary cross sectional view showing an anti-rotation pin positioned between a bearing race and a housing member and engaging a FIL Strip to thereby prevent rotation of the bearing race relative to the housing, and to prevent rotation of the FIL Strip relative to the housing and/or the bearing race.

With further reference to FIG. 10, a first surface depression 78 may be formed in an inner surface 80 of outer housing 18, and a second surface depression 82 may be formed in an outer surface 84 of outer race 24. The depressions 78 and 82 may be generally cylindrical. A non-conductive anchor member such as a pin 86 may be positioned between the outer housing 18 and outer race 24 with the pin 86 in contact with the first and second depressions 78 and 82, respectively. The pin 86 may be made from a fiber reinforced polymer material or other suitable material. The pin 86 may be configured/sized to tightly engage surfaces 78 and 82 to provide an interference fit. The elongated FIL Strip 40 may have end surfaces 88A and 88B positioned directly adjacent the pin 86. The pin 86 prevents movement of outer race 24 relative to outer housing 18, and pin 86 also prevents rotation of FIL Strip 40 relative to outer housing 18 and outer race 24.

The elongated FIL Strip 40 (FIGS. 6 and 7) is initially molded from nylon or other suitable polymer material in a continuous process to form an elongated flexible strip. The elongated strip may be wound onto a spool (not shown) for transportation, handling, and storage purposes. During assembly of bearing assembly 15 (FIG. 3) the FIL Strip 40 is first cut to the proper length. Bearing assemblies 20 of different sizes may be utilized, and the elongated FIL Strip 40 may be cut to the required length to extend/wrap around the outer race 24. The FIL Strip 40 is preferably cut to a length closely corresponding to the circumference of outer race 24 whereby a single piece of the FIL Strip 40 can be wrapped around the outer race 24 with little or no gap between the opposite ends of the FIL Strip 40. Alternatively, a plurality of shorter FIL Strips may be cut and wrapped around the outer race 24. Because the FIL Strip 40 can be cut to length, the FIL Strip 40 can be stored on a spool, and pieces of the FIL Strip 40 can be cut to length as required for bearings of different sizes. Also, the flexible connecting portions 48 (FIGS. 6 and 7) between the segments 46, and the gaps 56A and 56B between the legs 50A and 50B, respectively, permit the FIL Strip 40 to be flexed to accommodate bearings having a wide range of diameters.

In the examples described above, the FIL Strip 40 is positioned between outer housing 18 and outer race 24. However, it will be understood that the FIL Strip 40 may, alternatively, be positioned between inner race 22 and inner housing 16 and clamp 34. Referring to FIG. 5, it will be understood that the inner housing 16 and clamp 34 may be configured to provide an annular space that accommodates the FIL Strip 40. Also, it will be understood that FIL Strip 40 may be utilized with a wide variety of bearings in a wide variety of applications, and the present invention is not limited to the specific thin section bearing assembly described herein. Furthermore, the FIL Strip 40 may be utilized in a wide variety of applications in addition to the CT scanning machine 1 of FIGS. 1 and 2.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. An electrically isolated bearing assembly comprising:
a housing assembly including a ring-shaped inner housing and ring-shaped outer housing defining an annular space therebetween;
a bearing disposed in the annular space, the bearing including at least one metal inner race and at least one metal outer race and a plurality of metal roller elements disposed between the at least one metal inner race and the at least one metal outer race;
at least one elongated flexible insulating member disposed between the bearing and at least a selected one of the inner housing and the outer housing, wherein the elongated flexible insulating member comprises a material that is electrically non-conductive to prevent formation of an electrical path through the roller elements, and wherein the elongated flexible insulating member has an elongated central portion and a first segmented leg structure extending from the central portion and a second segmented leg structure extending from the central portion whereby the elongated flexible insulating member is generally U-shaped wherein the first and second segmented leg structures each include a plurality of legs that are disconnected from one another to permit flexing of the elongated flexible insulating member about the elongated central portion, and wherein at least a portion of a selected one of the at least one metal inner race and the at least one metal outer race is disposed between the first and second segmented leg structures.

2. The electrically isolated bearing assembly of claim 1, wherein:
the plurality of legs define spaced apart flanges.

3. The electrically isolated bearing assembly of claim 2, wherein:
each flange defines inner and outer surfaces, and wherein at least one of the inner and outer surfaces has a concave curvature.

4. The electrically isolated bearing assembly of claim 3, wherein;

the outer surface of each flange has the concave curvature, and wherein the inner surface of each flange has a convex curvature.

5. The electrically isolated bearing assembly of claim 4, wherein:
the inner and outer surfaces of the flanges define a dimension therebetween, and wherein the dimension is substantially uniform.

6. The electrically isolated bearing assembly of claim 1, wherein:
the elongated central portion includes a plurality of spaced apart segments that are interconnected by connecting portions having increased flexibility relative to a flexibility of the segments.

7. The electrically isolated bearing assembly of claim 6, wherein:
each segment defines first and second opposite edge portions;
at least one leg extends from each first opposite edge portion, and at least one leg extends from each second opposite edge portion, and wherein adjacent legs define gaps therebetween corresponding to adjacent connecting portions whereby flexing of the connecting portions causes a dimension of the corresponding gap to increase or decrease.

8. The electrically isolated bearing assembly of claim 7, wherein:
each segment has inner and outer surface portions that define a uniform thickness therebetween.

9. The electrically isolated bearing assembly of claim 8, wherein:
the connecting portions define thicknesses that are less than the thicknesses of the segments.

10. The electrically isolated bearing assembly of claim 8, wherein:
the elongated flexible insulating member defines an annular center line;
at least one of the inner and outer surface portions of the segments has a concave surface that is curved when viewed in a cross sectional view taken transverse to the annular centerline.

11. The electrically isolated bearing assembly of claim 10, wherein:
the inner surfaces of the segments abut the outer race, and the outer surfaces of the segments abut the outer housing whereby the segments flex to reduce a curvature of the concave surface.

12. The electrically isolated bearing assembly of claim 1, wherein:
the elongated flexible insulating member comprises a polymer material.

13. The electrically isolated bearing assembly of claim 1, including:
an anchor connecting the elongated flexible insulating member to the housing assembly to prevent rotation of the elongated flexible insulating member relative to the housing assembly.

14. The electrically isolated bearing assembly of claim 1, wherein:
the elongated central portion includes at least one groove extending lengthwise along the elongated flexible insulating member to define an elongated cut line adjacent to the first segmented leg structure whereby the elongated flexible insulating member can be cut at the groove to remove the first segmented leg structure.

15. The electrically isolated bearing assembly of claim 14, wherein:
the at least one groove comprises a first groove defining a first cut line and a second groove extending lengthwise along the elongated flexible insulating member adjacent to the second segmented leg structure to define a second cut line along which the elongated flexible insulating member can be cut to remove the second segmented leg structure.

16. An elongated flexible insulating strip for electrically insulating a bearing race, the elongated flexible insulating strip comprising:
a central portion including a plurality of base segments that are interconnected by flexible connecting portions having increased flexibility relative to the base segments;
at least one segmented leg structure including a plurality of spaced apart leg portions extending transversely from the central portion to permit flexing of the connecting portions; and wherein:
the elongated flexible insulating strip comprises an electrically nonconductive polymer material whereby the elongated flexible insulating strip is configured to be cut to length and flexed into an annular shape corresponding to an annular bearing race.

17. The elongated flexible insulating strip of claim 16, wherein:
the central portion defines an elongated central portion and comprises elongated first and second opposite edge portions extending along opposite sides of the elongated central portion; and
the at least one segmented leg structure includes a first segmented leg structure extending from the elongated first opposite edge portion and a second segmented leg structure extending transversely from the second opposite edge portion to define a race-receiving space between the first and second segmented leg structures, wherein the first segmented leg structure includes a plurality of spaced apart leg portions, and the second segmented leg structure includes a plurality of spaced apart leg portions.

18. The elongated flexible insulating strip of claim 17, wherein:
at least one of the leg portions is curved.

19. The elongated flexible insulating strip of claim 18, wherein:
the base segments define inner and outer opposite surfaces, and wherein at least one of the inner and outer surfaces has a concave curved shape when viewed in a cross section transverse to the length of the strip.

20. The elongated flexible insulating strip of claim 19, wherein:
portions of the base segments have a substantially uniform thickness.

21. The elongated flexible insulating strip of claim 20, wherein:
each base segment includes at least one groove defining a cut line extending along the elongated central portion whereby the strip can be cut along the cut line to remove the first segmented leg structure.

22. The elongated flexible insulating strip of claim 20, wherein:
each base segment includes first and second groove structures to define first and second cut lines extending along the central portion whereby the elongated flexible insulating strip can be cut along a selected one of the first and second cut lines.

23. A method of electrically isolating a bearing of the type that includes an electrically conductive inner race and an electrically conductive outer race and a plurality of electrically conductive roller elements disposed between the inner and outer races, the method comprising:
  providing an elongated flexible insulating strip comprising a material that is electrically non-conductive, the elongated flexible insulating strip having an elongated central portion, an elongated first edge portion, an elongated second edge portion opposite the elongated first edge portion, and at least one integrally formed leg portion that extends from the elongated first edge portion transverse to the central portion, wherein the integrally formed leg portion includes a plurality of spaced-apart legs defining gaps therebetween, each gap defining a size;
  cutting the elongated flexible insulating strip to length;
  flexing the cut elongated flexible strip to change the sizes of the gaps and to form a ring;
  positioning the cut elongated flexible strip in an annular space between a bearing race and a housing.

24. The method of claim 23, wherein:
  the elongated strip includes a leg portion extending transversely from the elongated second edge portion, whereby the elongated strip defines a race-receiving space between the leg portion that extends from the elongated first edge portion and the leg portion that extends from the elongated second edge portion, and wherein flexing the cut elongated flexible strip causes the race-receiving space to curve.

25. The method of claim 24, wherein:
  the leg portion extending from the elongated second edge portion comprises a plurality of spaced apart legs defining gaps therebetween;
  wherein flexing of the cut elongated flexible strip includes flexing the elongated central portion of the cut elongated flexible insulating strip whereby sizes of the gaps of the leg portion extending from the elongated second edge portion change.

26. The method of claim 25, wherein:
  the elongated central portion includes at least one elongated groove that defines a cut line extending along a length of the elongated central portion; and including:
  cutting the elongated flexible insulating strip along the cut line.

27. The method of claim 23, including:
  forming a first depression in a surface of the bearing race;
  forming a second depression in a surface of the housing;
  aligning the first and second depressions; and
  engaging the first and second depressions with a non-conductive anchor member to prevent rotation of the bearing race relative to the housing.

28. The method of claim 27, wherein:
  the elongated flexible strip includes an end surface; and including:
  positioning the end surface adjacent to the anchor member to limit lengthwise movement of the elongated flexible insulating strip relative to the bearing race and the housing.

29. A method of electrically isolating a bearing of the type that includes an electrically conductive inner race and an electrically conductive outer race and a plurality of electrically conductive roller elements disposed between the inner and outer races, the method comprising:
  providing an elongated flexible insulating strip comprising a material that is electrically non-conductive, the elongated flexible insulating strip having an elongated central portion, an elongated first edge portion, an elongated second edge portion opposite the elongated first edge portion, and at least one integrally formed leg portion that extends from the elongated first edge portion transverse to the central portion;
  cutting the elongated flexible insulating strip to length;
  flexing the cut elongated flexible strip to form a ring;
  positioning the cut elongated flexible strip in an annular space between a bearing race and a housing;
  the elongated central portion of the elongated flexible insulating strip comprises a plurality of segments that are interconnected by connecting portions having increased flexibility relative to the segments;
  wherein flexing of the cut elongated flexible strip includes flexing the connecting portions to bend the elongated flexible insulating strip to form a ring shape.

30. A method of electrically isolating a bearing of the type that includes an electrically conductive inner race and an electrically conductive outer race and a plurality of electrically conductive roller elements disposed between the inner and outer races, the method comprising:
  providing an elongated flexible insulating strip comprising a material that is electrically non-conductive, the elongated flexible insulating strip having an elongated central portion, an elongated first edge portion, an elongated second edge portion opposite the elongated first edge portion, and at least one integrally formed leg portion that extends from the elongated first edge portion transverse to the central portion;
  cutting the elongated flexible insulating strip to length;
  flexing the cut elongated flexible strip to form a ring;
  positioning the cut elongated flexible strip in an annular space between a bearing race and a housing;
  the at least one leg portion is initially curved and defines a curvature prior to positioning the elongated flexible insulating strip between a bearing race and a bearing housing; and including:
  positioning the at least one leg portion between the bearing race and the bearing housing with the at least one leg portion contacting the bearing race and the bearing housing to thereby bend the at least one leg portion in a manner that reduces the curvature of the at least one leg portion.

31. A method of electrically isolating a bearing of the type that includes an electrically conductive inner race and an electrically conductive outer race and a plurality of electrically conductive roller elements disposed between the inner and outer races, the method comprising:
  providing an elongated flexible insulating strip comprising a material that is electrically non-conductive, the elongated flexible insulating strip having an elongated central portion, an elongated first edge portion, an elongated second edge portion opposite the elongated first edge portion, and at least one integrally formed leg portion that extends from the elongated first edge portion transverse to the central portion;
  cutting the elongated flexible insulating strip to length;
  flexing the cut elongated flexible strip to form a ring;
  positioning the cut elongated flexible strip in an annular space between a bearing race and a housing;
  the elongated central portion has at least one inner surface and at least one outer surface, and wherein at least one of the at least one inner surface and the at least one outer surface is initially non-planar, and wherein the elongated central portion defines an axis extending along a length of the elongated central portion;

wherein the flexing of the cut elongated flexible strip includes flexing the elongated central portion whereby the axis forms an annular ring; and causing the at least one inner surface and the at least one outer surface of the elongated central portion to engage an outer surface of the bearing race and a surface of the housing, respectively, such that the elongated central portion bends in a direction that is transverse to the axis.

32. The method of claim 31, wherein:

a selected one of the at least one inner surface and the at least one outer surface of the elongated central portion is initially concave, and the other of the at least one inner surface and the at least one outer surface of the elongated central portion is initially convex, and including:

causing the convex surface to contact a selected one of an outer surface of the bearing race and a surface of the housing to thereby bend the elongated central portion in a direction that is transverse to the axis.

33. An electrically isolated bearing assembly comprising:

a housing assembly including a ring-shaped inner housing and ring-shaped outer housing defining an annular space therebetween;

a bearing disposed in the annular space, the bearing including at least one metal inner race and at least one metal outer race and a plurality of metal roller elements disposed between the at least one metal inner race and the at least one metal outer race;

at least one elongated flexible insulating member disposed between the bearing and at least a selected one of the inner housing and the outer housing, wherein the elongated flexible insulating member comprises a material that is electrically non-conductive to prevent formation of an electrical path through the roller elements, and wherein the elongated flexible insulating member has an elongated central portion and a leg structure extending transversely from the elongated central portion and wherein the elongated central portion of the elongated flexible insulating strip comprises a plurality of segments that are interconnected by connecting portions having increased flexibility relative to the segments.

34. An electrically isolated bearing assembly comprising:

a housing assembly including a ring-shaped inner housing and ring-shaped outer housing defining an annular space therebetween;

a bearing disposed in the annular space, the bearing including at least one metal inner race and at least one metal outer race and a plurality of metal roller elements disposed between the at least one metal inner race and the at least one metal outer race;

at least one elongated flexible insulating member disposed between the bearing and at least a selected one of the inner housing and the outer housing, wherein the elongated flexible insulating member comprises a material that is electrically non-conductive to prevent formation of an electrical path through the roller elements, and wherein the elongated flexible insulating member has an elongated central portion and a leg structure extending transversely from the elongated central portion and wherein the leg structure is initially curved and defines a curvature prior to positioning the elongated flexible insulating strip between the bearing and the housing assembly, and wherein the leg structure contacts the bearing and the housing and bends the leg structure in a manner that reduces the curvature.

35. An electrically isolated bearing assembly comprising:

a housing assembly including a ring-shaped inner housing and ring-shaped outer housing defining an annular space therebetween;

a bearing disposed in the annular space, the bearing including at least one metal inner race and at least one metal outer race and a plurality of metal roller elements disposed between the at least one metal inner race and the at least one metal outer race;

at least one elongated flexible insulating member disposed between the bearing and at least a selected one of the inner housing and the outer housing, wherein the elongated flexible insulating member comprises a material that is electrically non-conductive to prevent formation of an electrical path through the roller elements, and wherein the elongated flexible insulating member has an elongated central portion and a leg structure extending transversely from the elongated central portion and wherein;

the elongated central portion has at least one inner surface and at least one outer surface, and wherein at least one of the at least one inner surface and the at least one outer surface is initially non-planar, and wherein the elongated central portion defines an axis extending along the length of the elongated central portion, and wherein the at least one inner surface and the at least one outer surface of the elongated central portion engage an outer surface of the bearing and a surface of the housing assembly, respectively, such that the elongated central portion bends in a direction that is transverse to the axis.

* * * * *